United States Patent [19]

Nelson

[11] 4,228,585
[45] Oct. 21, 1980

[54] ANIMAL NAIL CLIPPER

[76] Inventor: Wilbur C. Nelson, 2754 NE. 31st Ct., Lighthouse Point, Fla. 33064

[21] Appl. No.: 7,020

[22] Filed: Jan. 29, 1979

[51] Int. Cl.³ ............................................. A45D 29/02
[52] U.S. Cl. ..................................................... 30/29
[58] Field of Search ......................... 30/26, 27, 29, 233

[56] References Cited

U.S. PATENT DOCUMENTS

| | | | |
|---|---|---|---|
| 2,955,354 | 10/1960 | Laing | 30/29 |
| 3,370,353 | 2/1968 | Weissman | 30/233 |
| 3,838,507 | 10/1974 | Clark | 30/29 |
| 3,845,553 | 11/1974 | Fields | 30/29 |

Primary Examiner—Jimmy C. Peters
Attorney, Agent, or Firm—Barry L. Haley; Eugene F. Malin; Philip R. Wadsworth

[57] ABSTRACT

A nail clipper for clipping the nails of an animal such as a dog, cat or the like which allows for the clipping of an individual nail at the desired length to prevent injury or improper length cutting for the animal. The device includes a hand-actuated clipping blade used in conjunction with an adjustable in size nail holder which allows the nail to be clipped to be firmly held at a particular position relative to the nail cutting blade. The nail holder and positioner includes a disc having a plurality of apertures of different diameters which is moveable to position a desired aperture of a particular size adjacent the cutting blade. With the varying diameter apertures, the animal nail may be inserted in each aperture until an aperture is found that permits the nail to penetrate a particular distance based on the diameter size of the nail, which is tapered. The proper aperture is determined which allows only penetration to the point equal to the desired length of the nail portion to be cut. The selected aperture is then moved into position relative to the cutting blade and the nail inserted a particular length and held firmly while the blade is actuated by hand.

1 Claim, 5 Drawing Figures

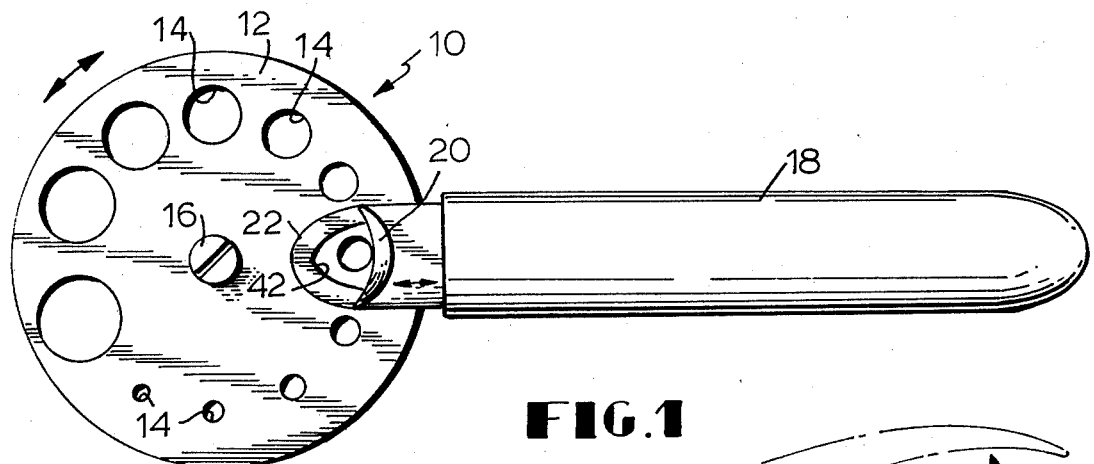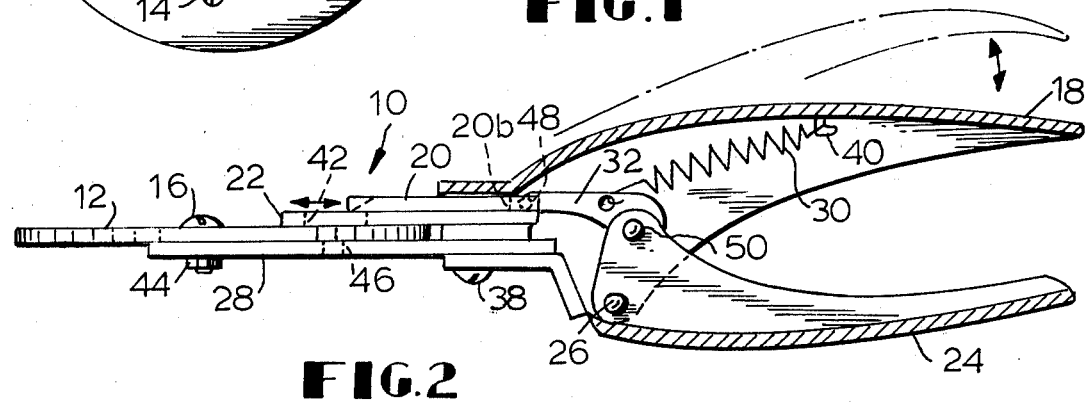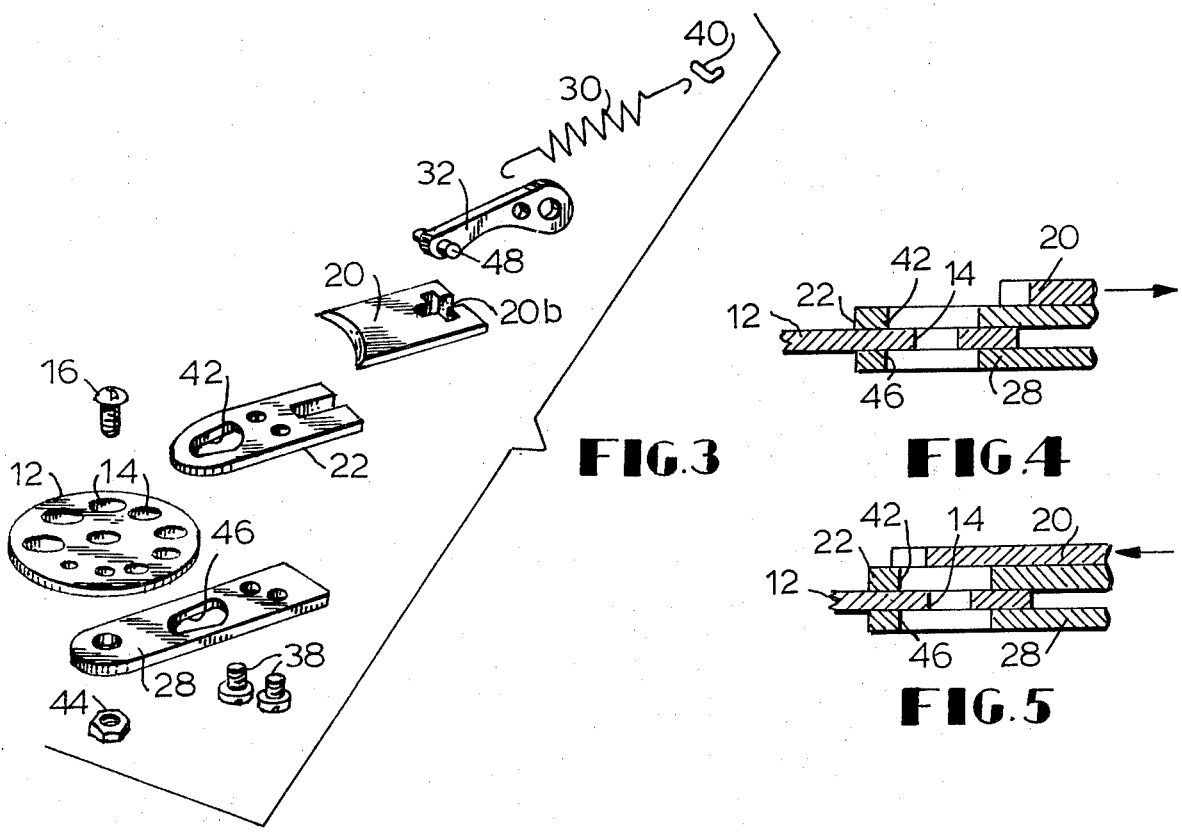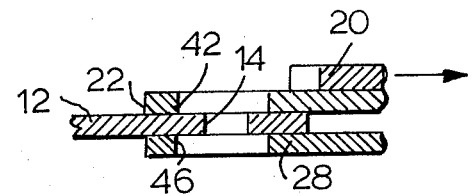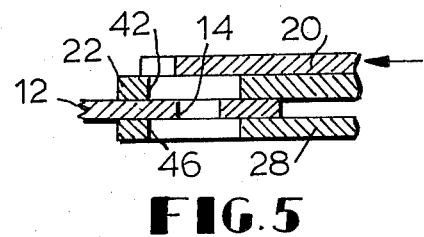

ANIMAL NAIL CLIPPER

BACKGROUND OF THE INVENTION

This invention relates generally to a device for clipping individually each nail of an animal such as a dog or cat or the like, and specifically to an animal nail clipper that will securely hold the animal's nail relative to the clipping blade while providing for cutting the nail at the desired length.

Most animals dislike having their nails clipped. Oftentimes the animals squirm and move around making it difficult to clip off the desired amount. Should too much nail be clipped off, an animal can be injured resulting in pain and bleeding of the animal.

Various animal nail clippers have been shown in the prior art such as U.S. Pat. No. 2,955,354 issued to Laing and U.S. Pat. No. 3,838,507 issue to Clark. One of the great deficiencies in prior art clippers is that there is no provision for holding the nail with respect to the clipping blades in such a position to cut the desired amount of nail, to prevent cutting the nail too short, which may result in injury.

The present invention overcomes this deficiency by providing hand actuated nail clippers for an animal which allow the user to clip the nail safely at the desired length while firmly securing it relative to the cutting blade during the cutting operation. This prevents the animal from squirming or moving while the nail is being cut since the nail is firmly held at the desired length relative to the cutting blade.

U.S. Pat. No. 2,955,354 issued to Laing employs a stop mounted above the cutting blade to prevent penetration through the aperture. The first problem is that the aperture does not firmly hold the nail since it is of a fixed size and secondly the arm that stops penetration of the nail is fixed relative to the blade opening such that there can be no compensation for variation between different animals as to the amount of length cut. The present invention, on the otherhand, insures that the nail is firmly held in the aperture relative to the blade opening, while at the same time the desired length of cut may be achieved while still permitting penetration only to a particular location.

BRIEF DESCRIPTION OF THE INVENTION

A device for cutting nails of an animal such as a dog, cat, or the like comprising a first handle, a second handle connected to said first handle and pivotably moveable relative thereto, a cutting blade connected to said first handle and moveable and connectable to said second handle, a blade guide connected to said first handle, said blade being mounted to slide upon said blade guide, said guide having a large aperture for receiving an animal nail, and a nail holder mounted adjacent said blade guide.

The nail holder, in one embodiment, includes an arm connected to the first handle and a disc having a plurality of apertures disposed thereabout, each of said apertures having a different diameter, said disc being moveably mounted to said arm. The disc is mounted so that apertures in the disc can be moveably positioned such that the blade passes over the central axis of the aperture providing alignment of the nail holding aperture and the blade guide aperture. The blade, blade guide, and handles function in a conventional manner as far as the actual clipping of the nail. To operate the device, the nail to be clipped is inserted until a particular aperture is found which stops the penetration of a nail at a desired position relative to the blade. This is occasioned by the fact that the animal's nails are tapered and a particular aperture of the nail holder can be found which stops and holds the nail at a particular penetration distance. Once this aperture is found, then the aperture is moved to the blade area and the animal's nail inserted, arriving at the proper penetration distance which also acts to hold the nail. The nail is then clipped and removed and the clipping proceeds onto the other nails of the animal. Since these may vary in size, again the selection process of the various apertures is utilized.

It is an object of this invention to provide an improved nail clipper for an animal such as a dog or cat that provides safety while clipping the animal's nails to prevent injury or harm to the animal.

It is another object of this invention to provide a nail clipper which allows for adjustably achieving the cutting of an animal's nail at a desired length while firmly holding the nail relative to the clipping blade.

But yet still another object of this invention is to provide an animal nail clipper which is readily used for various types of clipping blades which both holds and adjustably determines the length of the nail to be cut.

In accordance with these and other objects which will be apparent hereinafter, the instant invention will now be described with particular reference to the accompanying drawings.

BRIEF DESCRIPTION OF THE DRAWINGS

FIG. 1 is a top plan view showing the instant invention.

FIG. 2 is a side elevational view showing the instant invention.

FIG. 3 shows an exploded fragmentary view of a portion of the instant invention.

FIG. 4 shows a side elevational view in cross-section of a fragmentary portion of the instant invention prior to movement of the cutting blade.

FIG. 5 shows the same view as FIG. 4 with the blade positioned in the cutting position.

PREFERRED EMBODIMENT OF THE INVENTION

Referring now to the drawings and specifically FIG. 1, the instant invention is shown generally at 10 comprised of a rigid disc 12 having a plurality of apertures 14 of different diameters disposed within, the disc being mounted by screw 16 to a clipping device comprised of an upper handle 18 and a cutting blade 20 mounted on a blade guide 22.

Referring now to FIG. 2, the invention is shown such that the disc 12 is mounted on arm 28 by screw 16 connected to nut 44 which allows the disc 12 to be rotated to allow alignment of a particular aperture 14 relative to the cutting blade 20.

Handles 18 and 24 when squeezed together cause the blade to move in a forward direction passing over (see FIG. 3) aperture 42 which receives the animal nail to be clipped. The animal nail is positioned also through aperture 46 which is in the mounting arm for disc 12 and through one selected and pre-positioned apertures 14 disposed in disc 12. The handles 18 and 24, as shown in FIG. 2 are pivotally connected by a pin 26. Handle 24 is connected to blade 20 by linkage arm 32 and pin 50. Spring 30 is connected to handle 18 by a flange 40 and linkage arm 32 which provides for the spring tension against the action of the handle. The linkage arm 32 is connected to the blade 20 by pin 48 which is received in slot 20b in the blade. The disc mounting arm 28 is affixed by screws 38 to handle 18.

To operate the device, first the animal's paw is grasped and a determination is made as to the desired length of the animal's nail which is to be individually cut. The disc 12 and the apertures 14 are utilized to select a particular aperture that permits only a certain amount of penetration of the nail due to the diameter size of the disc aperture selected and the diameter thickness of the nail, which is normally tapered. Thus the nail is inserted in a particular aperture 14 and the amount of penetration is noted. This process is repeated until the proper and desired aperture is found which permits only penetration of the nail through the aperture in the disc a specific distance. Once the proper aperture is selected, the nail is removed and the disc is rotated to be coaxial with the blade mounting aperture. The nail is then inserted through the disc aperture and blade mounting aperture until it penetrates to the desired length and is held firmly there by the disc aperture. At this time, the handles are actuated, moving the blade causing the nail to be cut.

Thus, using the device, the nail will both be firmly held by the disc aperture of the proper size and at the desired length of nail to be cut. This eliminates any possibility of danger to the animal and prevents the animal from moving the nail during the cutting operation.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device for safely cutting individual nails of an animal to a predetermined length while securely holding the nail in position relative to the cutting blade, comprising:

a cutting blade;

a means for mounting said cutting blade, said mounting means having an aperture disposed therethrough;

mechanical actuating means for reciprocally moving said blade from a first position to a second position past said mounting aperture connected to said cutting blade and said mounting means; and a nail holding plate connected to said actuating means, said plate including at least two apertures, said apertures being of different diameters each aperture diameter sized to allow receipt of a portion of an animal nail to a predetermined length, said plate being movable to coaxially position one of said apertures relative to said blade mounting aperture, whereby an aperture may be selected to receive an animal nail to provide penetration to a predetermined length of said nail.

* * * * *